US008825469B1

(12) United States Patent
Duddu et al.

(10) Patent No.: US 8,825,469 B1
(45) Date of Patent: Sep. 2, 2014

(54) TECHNIQUES FOR TRANSLATING DOCUMENTS INCLUDING TAGS (75) Inventors: Sarveshwar Rao Duddu, Bangalore (IN); Franz Josef Och, Palo Alto, CA (US); Eahab E. Ibrahim, Santa Clara, CA (US); Joshua James Estelle, San Francisco, CA (US); Shankar Kumar, New York, NY (US)

(73) Assignee: Google Inc., Mountain View, CA (US)

( * ) Notice: Subject to any disclaimer, the term of this patent is extended or adjusted under 35 U.S.C. 154(b) by 409 days.

(21) Appl. No.: 13/350,897

(22) Filed: Jan. 16, 2012

Related U.S. Application Data (60) Provisional application No. 61/515,056, filed on Aug. 4, 2011.

(51) Int. Cl.
*G10L 15/00* (2013.01)
(52) U.S. Cl.
USPC .................................................. 704/4
(58) Field of Classification Search
USPC ................................................ 704/4, 5
See application file for complete search history.

(56) References Cited

U.S. PATENT DOCUMENTS

| 8,626,488 | B1* | 1/2014 | Kumar et al. | 704/4 |
| 2008/0133218 | A1* | 6/2008 | Zhou et al. | 704/5 |
| 2009/0112573 | A1 | 4/2009 | He | |
| 2011/0307244 | A1* | 12/2011 | He et al. | 704/4 |
| 2012/0101804 | A1* | 4/2012 | Roth et al. | 704/2 |

OTHER PUBLICATIONS

Liang, P. et al., "Alignment by Agreement," Proceeding HLT-NAACL '06 Proceedings of the Main Conference on Human Language Technology Conference of the North American Chapter of the Association of Computational Linguistics, Jun. 4, 2006, Stroudsburg, PA, USA, 8 pages.
Ganchev, K. et al., "Better Alignments = Better Translations?", In Proceedings of the 46th Annual Meeting of the Association of Computational Linguistics, Jun. 16-17, 2008, Columbus, OH, USA, 9 pages.
Och, F. et al., "Improved Statistical Alignment Models," ACL '00 Proceedings of the 38th Annual Meeting on Association for Computational Linguistics, Oct. 2, 2000, Stroudsburg, PA, USA, pp. 440-447.
Graca, J. et al., "Expectation Maximization and Posterior Constraints," Neural Information Processing Systems Conference (NIPS), Dec. 4, 2007, Vancouver BC, Canada, pp. 1-8.

(Continued)

*Primary Examiner* — Daniel D Abebe
(74) *Attorney, Agent, or Firm* — Remarck Law Group PLC (57) ABSTRACT

A computer-implemented method includes receiving a document and a request to translate the document to a different language, the document including at least one tag associated with a first portion of text within the document, receiving a manual translation of the document translated by a human translator but not including the at least one tag, generating a plurality of alignments between the document and the manual translation using a statistical alignment model, selecting one of the plurality of alignments based on a likelihood that the first portion of text in the document corresponds to an aligned second portion of text within the manual translation, mapping a location of the tag in the document to a corresponding location within the manual translation based on the selected alignment, and inserting the at least one tag into the manual translation at the corresponding location to obtain a modified manual translation of the document.

20 Claims, 7 Drawing Sheets

(56) References Cited

OTHER PUBLICATIONS

Deng, Y. et al., "Optimizing Word Alignment Combination For Phrase Table Training," Proceedings of the ACL-IJCNLP 2009 Conference Short Papers, Suntec, Singapore, Aug. 4, 2009, pp. 229-232.

Denero, J. et al., "Model-Based Aligner Combination Using Dual Decomposition," Proceedings of the 49th Annual Meeting of the Association for Computational Linguistics, Portland, Oregon, Jun. 19-24, 2011, pp. 420-429.

Extended European Search Report dated May 2, 2012 for EP Application No. 11193828.8, 13 pages.

Och, Franz Josef et al., "Improved Alignment Models for Statistical Machine Translation," Proceedings of the Conference on Empirical Methods in Natural Language Processing, 1999, pp. 20-28.

Vogel, Stephan et al., "HMM-Based Word Alignment in Statistical Translation," Proceedings of the 16th Conference on Computational Linguistics, 1996, pp. 836-841.

He, Xiaodong, "Using Word Dependent Transition Models in HMM based Word Alignment for Statistical Machine Translation," Proceedings of the Second Workshop on Statistical Machine Translation, Prague, Jun. 2007, pp. 80-87.

Brunning, Jamie et al., "Context-Dependent Alignment Models for Statistical Machine Translation," Proceedings of the North American Chapter of the Association of Computational Linguistics, 2009, 9 pgs.

Shindo, Hiroyuki et al., "Word Alignment with Synonym Regularization," Proceedings of the Association of Computational Linguistics, 2010, 5 pgs.

Rush, Alexander M. et al., "On Dual Decomposition and Linear Programming Relaxations for Natural Language Processing," Proceedings on the Conference on Empirical Methods in Natural Language Processing, 2010, 11 pgs.

Koo, Terry et al., "Dual Decomposition for Parsing with Non-Projective Head Automata," Proceedings on the Conference on Empirical Methods in Natural Language Processing, 2010, 11 pgs.

Och, Franz Josef et al., "Discriminative Training and Maximum Entropy Models for Statistical Machine Translation," Proceedings of the 40th Annual Meeting of the Association for Computational Linguistics (ACL), Philadelphia, Jul. 2002, pp. 295-302.

Och, Franz Josef et al., "A Comparison of Alignment Models for Statistical Machine Translation," Proceeding COLING '00 Proceedings of the 18th Conference on Computational Linguistics—vol. 2, PA, 2000, pp. 1086-1090.

Och, Franz Josef et al., "The Alignment Template Approach to Statistical Machine Translation," 2004 Association for Computational Linguistics, vol. 30, No. 4, pp. 417-449.

\* cited by examiner

TECHNIQUES FOR TRANSLATING DOCUMENTS INCLUDING TAGS

CROSS-REFERENCE TO RELATED APPLICATIONS

The present disclosure claims the benefit of U.S. Provisional Application No. 61/515,056, filed on Aug. 4, 2011. The disclosure of the above application is incorporated herein by reference in its entirety.

FIELD

The present disclosure relates to language translation and, more particularly, to techniques for translating a document that includes at least one tag associated with a portion of text within the document.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user may access a website from a computing device via a network such as the Internet. The website may display a webpage to the user via a web browser executing on the computing device. The webpage may include images, videos, text, or a combination thereof, to be displayed to the user on a display associated with the computing device. The displayed webpage is a visual representation of an underlying source document. The source document can include text as well as one or more tags associated with a portion of text. Each of the tags may be indicative of a characteristic (bold, italics, underlined, hyperlink, alignment, position, font, etc.) of the text portion associated therewith. For example, the tag may include a markup language tag defined by the hypertext markup language (HTML), the extensible markup language (XML), or the like. A web browser interprets the source document to generate the webpage, which in turn is viewed by the user.

SUMMARY

This section provides a general summary of the disclosure, and is not a comprehensive disclosure of its full scope or all of its features.

In various embodiments of the present disclosure, a computer-implemented technique is disclosed. The technique includes receiving a document from a server, the document including at least one tag associated with a first portion of text within the document, receiving a request from a user to translate the document from a first language to a second language, the second language being different than the first language, providing the document to a human translator, receiving a manual translation of the document from the human translator, the manual translation being a version of the document that has been translated from the first language into the second language by the human translator and that does not include the at least one tag, generating a plurality of alignments between the document and the manual translation of the document using a hidden Markov model and at least one other statistical alignment model, each of the plurality of alignments associating the first portion of text within the document with a second portion of text within the manual translation of the document, generating a probability score for each of the plurality of alignments using a translation corpus and a machine learning routine, the probability score for a specific alignment indicating a likelihood that the first portion of text within the document corresponds to the associated second portion of text in the manual translation of the document according to the specific alignment, selecting one of the plurality of alignments as a selected alignment based on the plurality of probability scores, the selected alignment having a highest corresponding probability score, mapping a location of the at least one tag in the document to a corresponding location within the manual translation based on the selected alignment, inserting the at least one tag into the manual translation at the corresponding location to obtain a modified manual translation of the document; and providing the modified manual translation of the document to the user.

In various embodiments of the present disclosure, a computer-implemented technique is disclosed. The technique includes receiving a document and a corresponding request from a user to translate the document from a first language to a second language, the document including at least one tag associated with a first portion of text within the document, the second language being different than the first language, receiving a manual translation of the document, the manual translation being a version of the document that has been translated from the first language into the second language by a human translator and that does not include the at least one tag, generating a plurality of alignments between the document and the manual translation of the document using a statistical alignment model, each of the plurality of alignments associating the first portion of text within the document to a second portion of text within the manual translation of the document, selecting one of the plurality of alignments as a selected alignment based on a likelihood that the first portion of text within the document corresponds to the associated second portion of text within the manual translation of the document according to the selected alignment, mapping a location of the at least one tag in the document to a corresponding location within the manual translation of the document based on the selected alignment, and inserting the at least one tag into the manual translation at the corresponding location to obtain a modified manual translation of the document.

In various embodiments of the present disclosure, a system configured to perform a document translation technique is disclosed. The system includes an alignment generation module and a translation control module. The alignment generation module is configured to generate a plurality of alignments between a document and a manual translation of the document using a statistical alignment model, the document including at least one tag associated with a first portion of text within the document, the manual translation being a version of the document that has been translated from a first language to a second language by a human translator and that does not include the at least one tag, the second language being different than the first language, each of the plurality of alignments associating the first portion of text within the document to a second portion of text within the manual translation of the document. The translation control module is configured to receive the document and a corresponding request from a user to translate the document from the first language to the second language, receive the manual translation of the document, select one of the plurality of alignments as a selected alignment based on a likelihood that the first portion of text within the document corresponds to the associated second portion of text within the manual translation of the document according to the selected alignment, map a location of the at least one tag in the document to a corresponding location within the manual translation of the document based on the selected alignment, and insert the at least one tag into the manual translation at the corresponding location to obtain a modified manual translation of the document.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously described, a webpage may be a visual representation of an underlying source document that includes various tags that indicate characteristics of associated text. The source document (or "document") may be accessed by or provided to a user of a computing device through a web server over a network such as the Internet. A web browser at the user's end may then interpret the document and thereby generate the webpage viewed by the user. Given the worldwide access to the Internet, a webpage may be viewed by a plurality of different users, one or more of which may speak and/or understand different languages. Therefore, providing webpages in a plurality of different languages may be desirable. Accordingly, the underlying source documents associated with webpages may be translated into different languages when requested.

Source documents may be translated according to a variety of different techniques. Machine translation, e.g., translation by a computer, can be faster and less expensive than manual translation, e.g., translation by a human translator. Due to various language anomalies, a manual translation of a document may be more accurate or otherwise more preferable than a machine translation. Human translators performing the manual translation of the document, however, may not understand the tags in the document, which may lead to a manual translation of the document that includes incorrect formatting or other characteristics due to incorrect or incomplete tagging.

Accordingly, techniques are presented for translating documents that include at least one tag. The techniques are generally directed to assisting a human translator that is performing a manual translation of a document from a first language to a second language. More specifically, the techniques provide for automatic insertion of the at least one tag from the original (source) document into the manual translation of the document. More specifically, the techniques include receiving a request from a user to translate the document from the first language to the second language. The document is then provided to a human translator who generates a manual translation of the document. The manual translation includes text that has been translated into the second language, but which does not include the at least one tag. For example, the at least one tag may be removed or parsed prior to or during manual translation.

The techniques further include generating a plurality of alignments between the document and the manual translation of the document. Each of the plurality of alignments may associate the portion of text within the document to a portion of text within the manual translation of the document. For example, the plurality of alignments may include word-to-word alignments, phrase-to-phrase alignments, or a combination thereof. The plurality of alignments may be generated using at least one statistical alignment model, e.g., a hidden Markov model.

The techniques further include selecting one of the plurality of alignments as a selected alignment based on a likelihood that a portion of text (a word, a phrase, a sentence, etc.) in the document corresponds to an associated portion of text in the manual translation of the document according to the selected alignment. In some embodiments, the selection of one of the plurality of alignments may be performed as follows. First, a probability score may be generated for each of the plurality of alignments using a translation corpus, e.g., a database of translations, and a machine learning routine or other algorithm configured to maintain probabilities for each entry in the translation corpus. One of the plurality of alignments may then be selected based on the probability scores, for example, the alignment having the highest corresponding probability score.

A location of the tag in the document may then be mapped to a corresponding location within the manual translation of the document based on the selected alignment. For example, the location may be associated with a word or a phrase in the manual translation of the document. The techniques may then insert the tag into the manual translation of the document based on the mapping to obtain a modified manual translation of the document. The modified manual translation of the document, which now includes the tag, may then be provided to a user and interpreted by a web browser to generate a translated webpage to display to the user.

Figure 1:
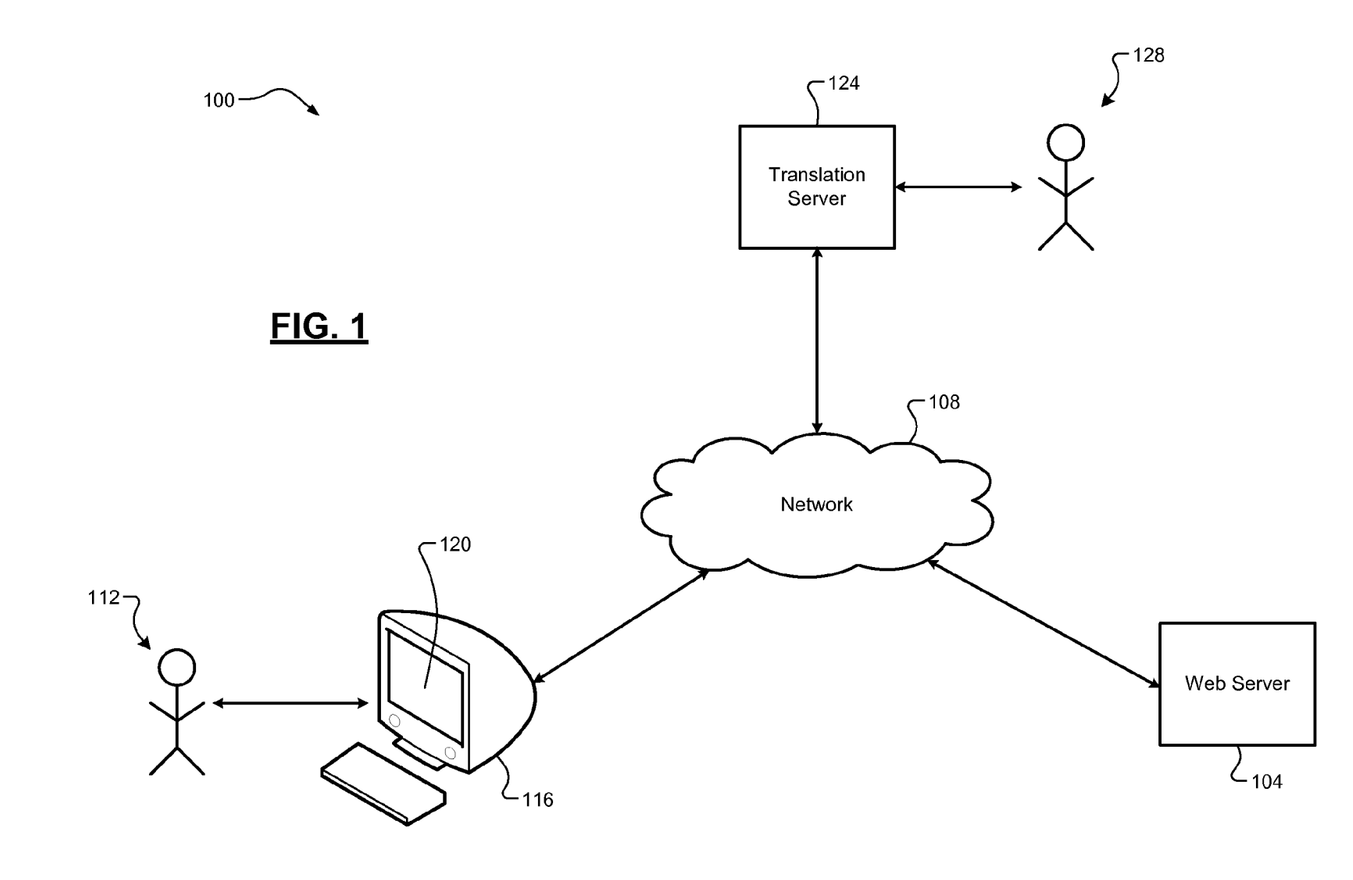
FIG. 1 is a schematic block diagram of an example network system that includes a translation server configured to perform a document translation technique according to some embodiments of the present disclosure.

Referring now to FIG. 1, an example network system 100 is shown that includes a translation server 124 configured to perform a translation technique according to some embodiments of the present disclosure on a document that includes at least one tag. It is appreciated that while a single tag is often described or referred to herein, the document may include a plurality of tags and therefore the document translation techniques may include the mapping and automatic insertion of a plurality of tags. The tag may be associated with a portion of text within the document. For example, the tag may be a markup language tag corresponding to a markup language such as HTML, XML, or the like.

A web server 104 may store and then selectively provide the document to a location in a network 108. For example, the network 108 may include a wide area network (WAN) such as the Internet, a local area network (LAN), or a combination thereof. More specifically, a user 112 may selectively access the document from the web server 104 via a computing device 116 on the network 108. The computing device 116 may include a display 120 that displays a web page using a web browser that interprets the document.

The translation server 124 may also be located at a location on the network 108. The translation server 124 may communicate via the network 108 with the user 112 (via computing device 116) and/or the web server 104. The translation server 124 is selectively provided with the document for translation from a first language to a second language, the second language being different than the first language. For example only, the first language may be Spanish and the second language may be English (see FIG. 4 and its corresponding description). The first and second languages, however, may each be any other suitable language, e.g., the first language may be English and the second language may be French (see FIG. 3 and its corresponding description).

The translation server 124 may also receive input from a human translator 128, the input representing or used to generate a manual translation of the document. For example, the human translator 128 may provide the input via another computing device (not shown), similar to computing device 116. In some embodiments, the manual translation, while including text that has been translated to the second language, does not include the at least one tag from the original document. While the human translator 128 is shown as being local to the translation server 124, the human translator 128 may be located elsewhere on the network 108 and may therefore provide the input (or manual translation) to the translation server 124 via the network 108.

In addition, the translation server 124 may generate a plurality of alignments between the document and the manual translation of the document. The translation server 124 may generate the plurality of alignments on either a word-by-word basis or a phrase-by-phrase basis. For example, the translation server 124 may generate the plurality of alignments using at least one statistical alignment model, such as a hidden Markov model. After receiving the manual translation of the document and the plurality of alignments, the translation server 124 may control the translation of the document according to a translation technique of some embodiments of the present disclosure to provide a translated document to the user 112, e.g., via the web server 104.

Figure 2:
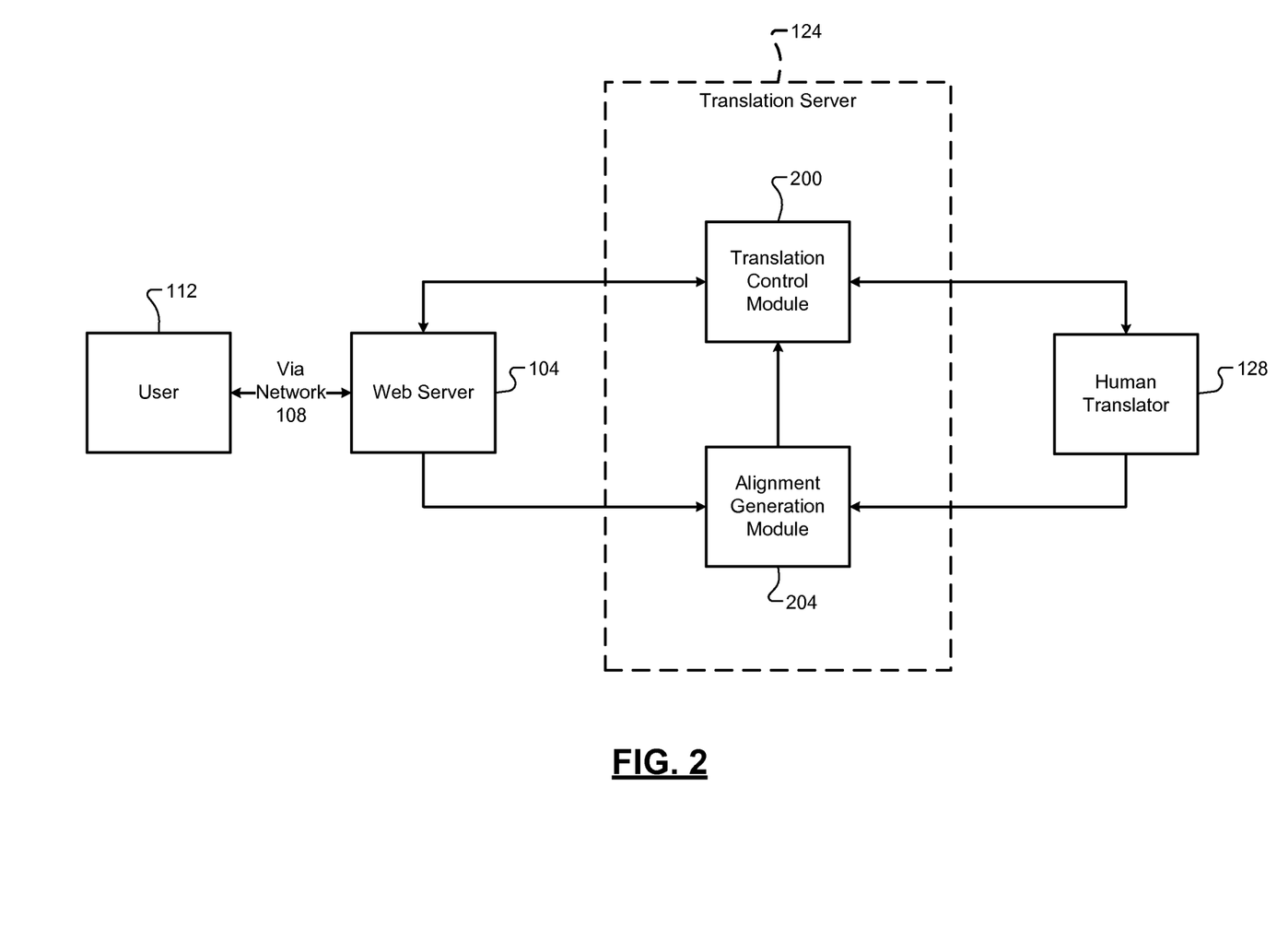
FIG. 2 is a schematic block diagram of an example of the translation server of FIG. 1.

Referring now to FIG. 2, an example of the translation server 124 according to some embodiments of the present disclosure is shown. The translation server 124 can include a translation control module 200 and an alignment generation module 204. While the alignment generation module 204 is shown to be part of the translation server 124, the alignment generation module 204 could instead be located external to the translation server 124, e.g., in another server, or elsewhere on the network 108. The alignment generation module 204 generates the plurality of alignments between the document and the manual translation of the document using at least one statistical alignment model. The translation control module 200 receives the plurality of alignments from the alignment generation module 204 and the manual translation of the document from the human translator 128. The translation control module 200 then coordinates translation of the document from the first language to the second language to provide the translated document to the user 112.

Figure 3:
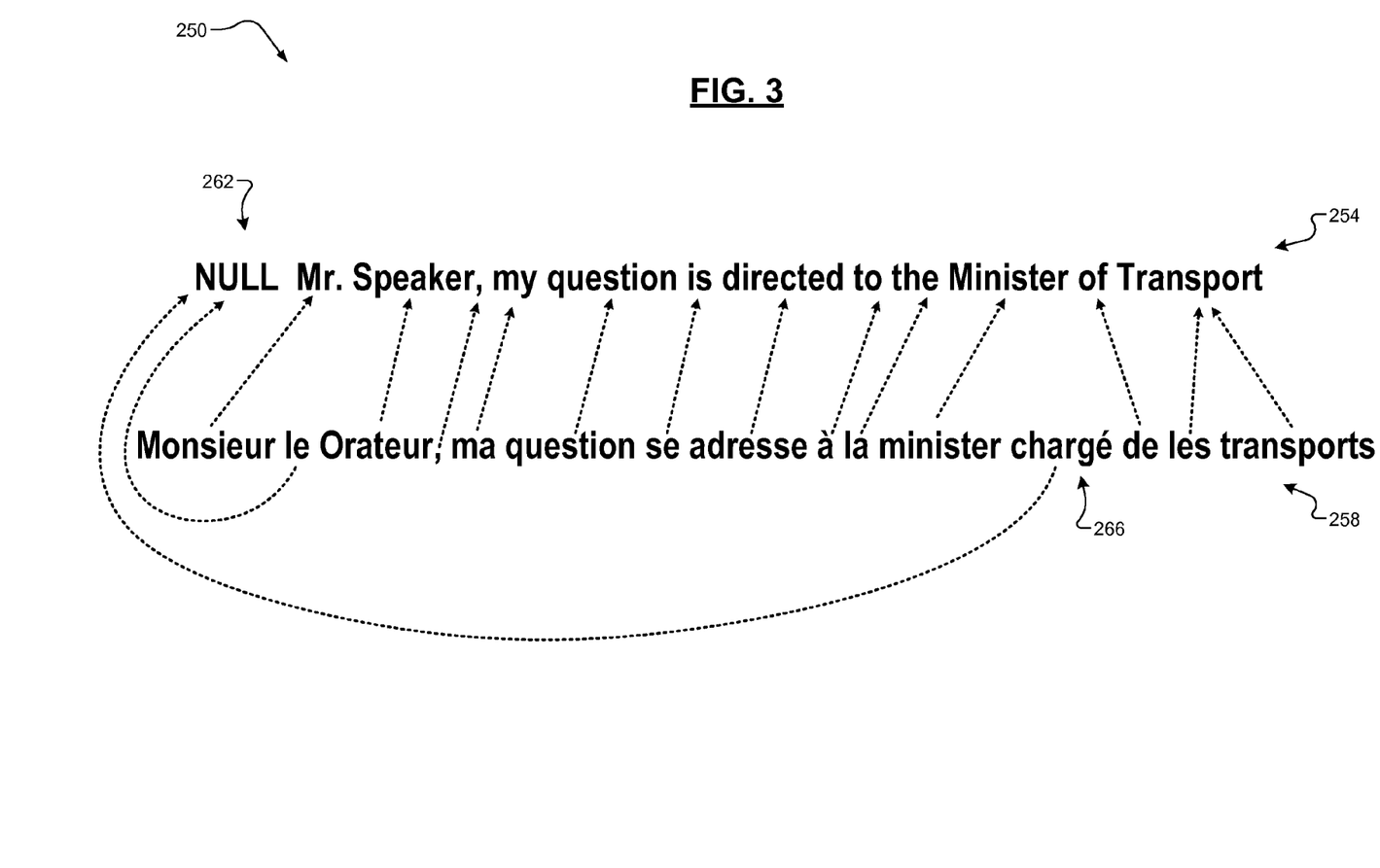
FIG. 3 is a diagram illustrating an example alignment of an English-French sentence pair according to some embodiments of the present disclosure.

Referring now to FIG. 3, an example alignment for an English-French sentence pair 250 is shown. An English sentence 254 recites "Mr. Speaker, my question is directed to the Minister of Transport[.]" A translated French sentence 258 recites "Monsieur le Orateur, ma question se adresse à la minister chargé les transports[.]" As shown, the English and French sentences 254 and 258, respectively, are aligned by a word-to-word mapping. Given this constraint, the English-French sentence pair 250 may be defined as follows:

$$(e^I, f^J) \qquad (1),$$

where $e^I$ represents the English sentence 254 ($e$) having I total words (I=12) and $f^J$ represents the French sentence 258 having J total words (J=15). In addition, the variables $e^I$ and $f^J$ may further include subscripts that indicate a number of the particular sentence, e.g., within a particular document. In other words, the subscripts may be used so that alignments may be defined for each sentence within a document.

An alignment may be generally defined as follows:

$$a^j = i \qquad (2),$$

where a is the alignment and indices i and j indicate particular words within the English sentence 254 and the French sentence 258, respectively. The value (i) of alignment $a^j$, therefore, indicates the alignment between the $j^{th}$ letter of the French sentence 258 and the $i^{th}$ letter of the English sentence 254. For example, $a^1=1$ indicates that a first word (i=1) in the English sentence 254 is aligned to a first word (j=1) in the French sentence 258 (e.g., Mr.→Monsieur). In addition, however, the English sentence 254 may include a NULL set 262, which may correspond to an additional indicia, e.g., i=0, or alternatively i=13. For example, the NULL set 262 may be used for additional French words that do not map to an English word, e.g., chargé 266.

For example, the alignment $a^J$ (also referred to as $a^j$, j=1 . . . 15) for the English-French sentence pair 250 may be as follows:

| | | |
|---|---|---|
| $a^1 = 1$ | $a^6 = 5$ | $a^{11} = 10$ |
| $a^2 = 0$ | $a^7 = 6$ | $a^{12} = 0$ |
| $a^3 = 2$ | $a^8 = 7$ | $a^{13} = 11$ |
| $a^4 = 3$ | $a^9 = 8$ | $a^{14} = 12$ |
| $a^5 = 4$ | $a^{10} = 9$ | $a^{15} = 12$ |

As previously mentioned, generating the plurality of alignments involves using at least one statistical alignment model. The statistical alignment model may be any suitable statistical model, such as statistical models involving hidden variables, maximum likelihood parameter estimation, e.g., an expectation-maximization (EM) algorithm, maximum likelihood or Viterbi alignment, or the like. Additionally or alternatively, the statistical alignment model may involve other statistical models, such as heuristic models, or may involve a combination of more than one statistical model. For example only, the alignment generation module 204 may generate the plurality of alignments using a plurality of different statistical alignment models, respectively.

One specific statistical alignment model that may be used is a hidden Markov model. For example, the hidden Markov model may have a $1^{st}$ order dependence in an alignment sequence $a^J$. In other words, $a^j$ may depend on $a^{j-1}$ (see above description with respect to FIG. 2). This is based on the assumption that sentences in different languages generally align linearly (or mostly linearly). Therefore, other parameters may be ignored. The remainder of the model is based on the actual words and lexicon matching. More specifically, probabilities for each word-word pairs may be determined.

A probability distribution (Pr) for a general French sentence ($f^J$) given a word-to-word alignment ($a^J$) with a general English sentence ($e^I$) may be generally modeled as follows:

$$Pr(f^J, a^J \mid e^I) = Pr(J \mid e^I) \times \prod_{j=1}^{J} Pr(f^j, a^j \mid (f^{j-1}, a^{j-1}, e^I)) \quad (3)$$

$$= Pr(J \mid e^I) \times \prod_{j=1}^{J} Pr(a^j \mid (f^{j-1}, a^{j-1}, e^I)) \cdot \quad (4)$$

$$Pr(f^j \mid (f^{j-1}, a^j, e^I))$$

$$= p(J \mid I) \times \prod_{j=1}^{J} p(a^j \mid a^{j-1}, I) \cdot p(f^j \mid e^{aj}). \quad (5)$$

For example, the probability distribution for the specific alignment of the English-French sentence pair 250 of FIG. 3 ($Pr[f^J, a^J | e^I]$, J=15, I=12) may be modeled as follows:

$$Pr(f^{15}, a^{15} \mid e^{12}) = Pr(15 \mid e^{12}) \times \prod_{j=1}^{15} Pr(f^j, a^j \mid f^{j-1}, a^{j-1}, e^{12}) \quad (6)$$

$$= Pr(15 \mid 12) \times \quad (7)$$

$$Pr(a^1 = 1 \mid 12) \times Pr(\text{Monsieur} \mid \text{Mr.}) \times \quad (8)$$

$$Pr(a^2 = 0 \mid a^1 = 1, 12) \times Pr(le \mid \text{NULL}) \times \quad (9)$$

$$Pr(a^3 = 2 \mid a^2 = 0, a^1 = 1, 12) \times \quad (10)$$

$$Pr(\text{Orateur} \mid \text{Speaker}) \times$$

$$Pr(a4 = 3 \mid a3 = 2, 12) \times Pr(, \mid ,) \times \quad (11)$$

$$Pr(a5 = 4 \mid a4 = 3, 12) \times Pr(ma \mid my) \times \quad (12)$$

$$\ldots \times \quad (13)\text{-}(21)$$

$$Pr(a15 = 12 \mid a14 = 12, 12) \times \quad (22)$$

$$Pr(\text{transports} \mid \text{Transport}).$$

The specific probability distributions calculations described above in Equations (7)-(22) may then be evaluated. Evaluation of a few specific calculations from Equations (7)-(22) are now described for illustrative purposes only. For example, Equation (7) may be evaluated as $P(a^1=1|12)=\frac{1}{13}$, because this is the start of the sentence and there are 13 possibilities for the variable $a^1$. The 13 possibilities include any of the 12 English words and the NULL (empty word) category. For example, Equation (8) may be evaluated as $P(a^2=0|a^1=1, 12)=$a constant, e.g., 0.2. This constant may be tuned for each language pair, e.g., English-French. For example, Equation (9) may be evaluated as $P(a^3=2|a^2=0, a^1=1, 12)=Pr(\text{Jump}=1)$ because $a^3-a^1=2-1=1$. In other words, a position such as $a^2$ may be ignored because it aligns to an empty word, i.e., the NULL category. Pr(Jump=1) indicates that the specific probability calculation is skipped and the calculation continues. Similarly, for example, Equations (10) and (11) may also each evaluate to Pr(Jump=1) because $a^4-a^3=3-2=1$ and $a^5-a^4=4-3=1$, respectively. In other words, these indicate linear alignments and therefore may be ignored as well.

Figure 4:
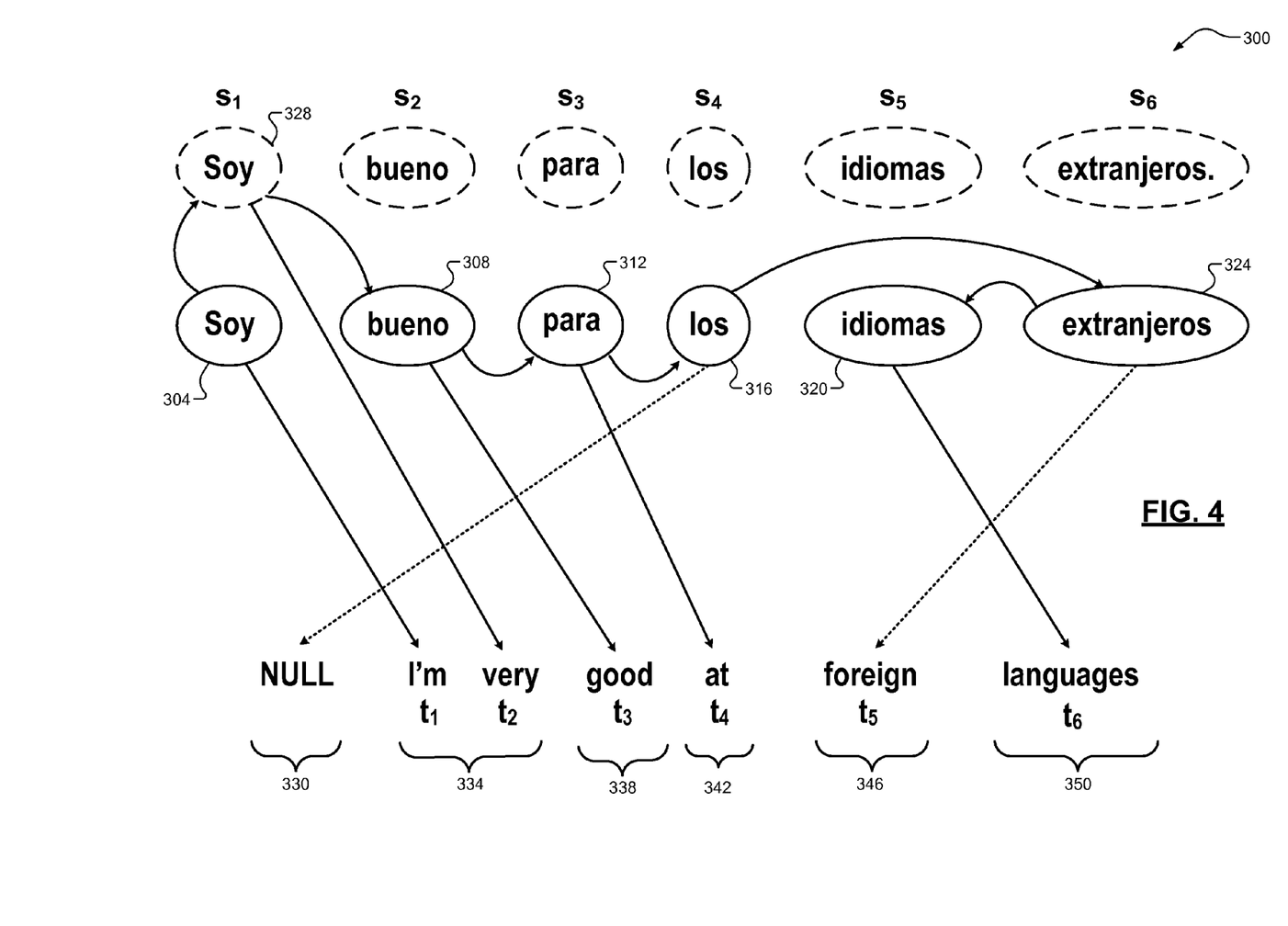
FIG. 4 is a state diagram of an example hidden Markov model used in generating an alignment for a Spanish-English sentence pair according to some embodiments of the present disclosure.

Referring now to FIG. 4, an example state diagram 300 is shown for a hidden Markov model-based alignment between a Spanish sentence and an English sentence. The Spanish sentence reads "Soy bueno para los idiomas extranjeros[.]" whereas the corresponding English translated sentence reads "I'm very good at foreign languages[.]" While the state diagram 300 illustrates a Spanish-to-English alignment, a similar state diagram may be implemented for alignments for other language-to-language translations, e.g., English-to-French, as described above. Furthermore, while the state diagram 300 includes states each corresponding to one word, e.g., a one-to-one alignment, as previously described, other alignments may also be implemented.

The state diagram 300 includes six input states 304, 308, 312, 316, 320, and 324 corresponding to Spanish words $s_1$, $s_2$, $s_3$, $s_4$, $s_5$, and $s_6$, respectively. In addition, state 304 further includes a sub-state, or secondary state 328, (described in more detail later). Sub-states or secondary states such as state 328 may exist because of additional words in the translated language (English) that correspond to a single word in the original language (Spanish), e.g., Soy→I'm very. The state diagram 300 further includes six output states 330, 334, 338, 342, 346, and 350. Note that output state 330 corresponds to a NULL state, which includes words from the original language (Spanish) that do not exist in the translated language (English), e.g., los.

As shown, the English translation (output states 330-350, collectively) may not follow the same order as the Spanish input (input states 304-328, collectively). In the illustrated example of FIG. 4, for example, the first input state 304 (source word $s_1$) and its secondary state 328 (also source word $s_1$) are aligned with output state 334 (translated words $t_1$ and $t_2$). Input state 308 (source word $s_2$) is aligned with output state 338 (translated word $t_3$). Input state 312 (source word $s_3$) is aligned with output state 342 (translated word $t_4$). Input state 316 (source word $s_4$) is aligned with output state 330, which is the NULL state (no translated word). Input state 320 (source word $s_5$) is aligned with output state 350 (translated word $t_6$). Lastly, input state 324 (symbol $s_6$) is aligned with output state 346 (translated word $t_5$).

Referring again to FIG. 2, the translation control module 200 may determine the location at which to insert the tag into the manual translation by selecting one of the plurality of alignments based on a likelihood that a portion of text in the document corresponds to a portion of text in the manual translation of the document. In some embodiments, the translation control module 200 may generate a probability score for each of the plurality of alignments using a translation corpus, e.g., a database of translations, and a machine learning routine or other algorithm configured to maintain probabilities for each entry in the translation corpus. The translation control module 200 may then select the one of the plurality of alignments based on the probability scores, such as the alignment having the highest corresponding probability score.

The translation control module 200 may then determine a mapping for the tag based on the selected alignment. More specifically, the translation control module 200 may determine a location for the tag in the manual translation of the document based on the location of the tag in the original (source) document and the selected alignment. The translation control module 200 may then insert the tag into the manual translation at the corresponding location based on the mapping, thereby obtaining a modified manual translation of the document. The modified manual translation of the document may then be output to the user 112, e.g., via the web server 104.

Figure 5:
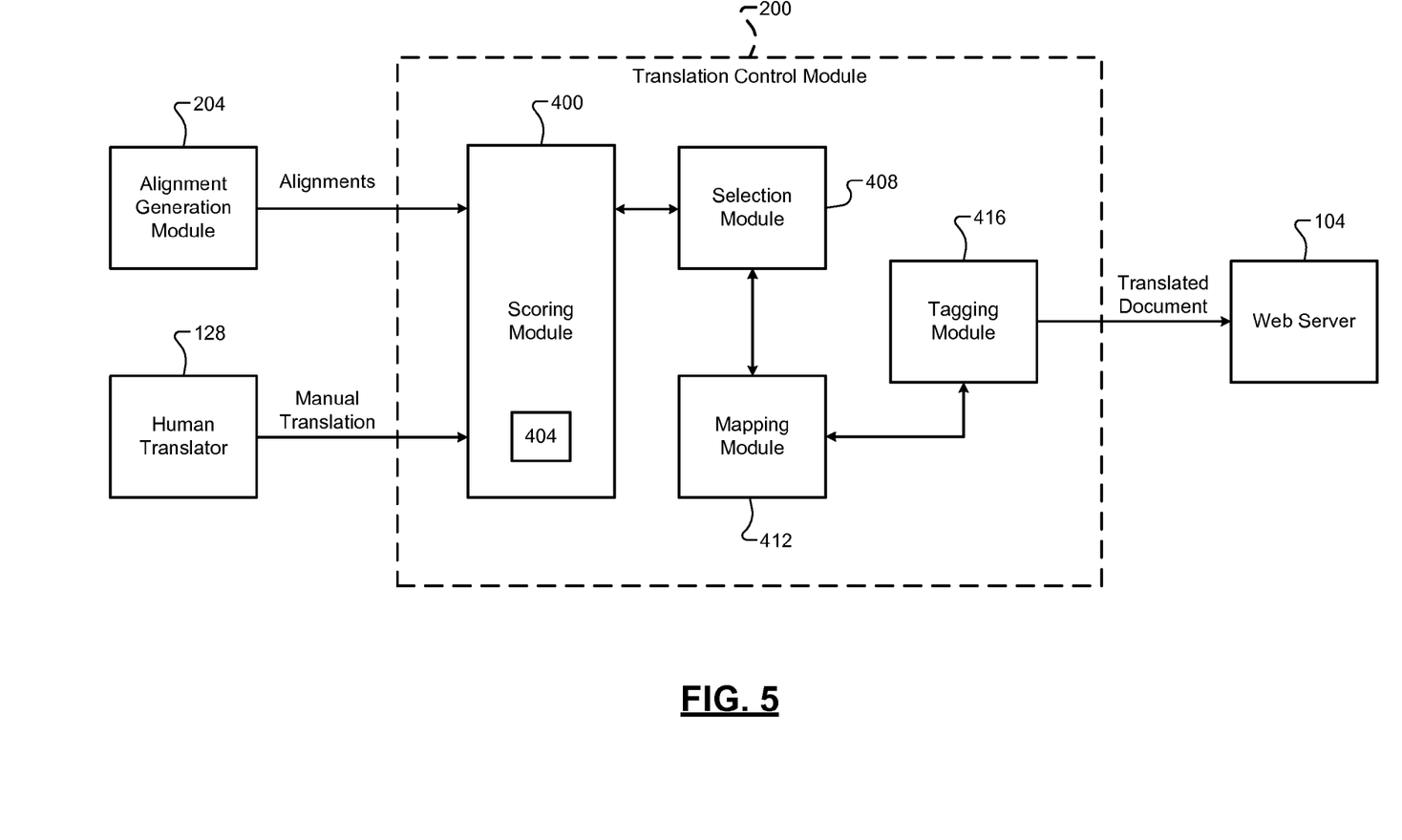
FIG. 5 is a schematic block diagram of an example of a translation control module of the translation server of FIG. 2.

Referring now to FIG. 5, an example of the translation control module 200 is shown. The translation control module 200 may include a scoring module 400, a selection module 408, a mapping module 412, and a tagging module 416. The scoring module 400 may further include a machine learning routine 404 or similar algorithm used in determining probability scores, as described above.

The scoring module 400 receives the plurality of alignments of the document from the alignment generation module 204. The scoring module 400 also receives the manual translation of the document from the human translator 128. The scoring module 400 then generates a probability score for each of the plurality of alignments using a translation corpus, e.g., a database of translations, and the machine learning routine 404 or other algorithm configured to maintain probabilities for each entry in the translation corpus.

For example, for each of the plurality of alignments, the machine learning routine 404 may determine likelihoods that aligned portions of text (in each of the document and the manual translation of the document) are correctly translated. In other words, the machine learning routine 404 may provide for recognizing complex patterns in the text of the document which correspond to patterns in the text of the manual translation of the document. An alignment having more of these recognized patterns may have a higher likelihood of similarity (between the document and the manual translation of the document), which may result in a higher probability score.

The selection module 408 communicates with the scoring module 400 to select one of the plurality of alignments. As previously mentioned, the selection module 408 may select one of the plurality of alignments based on a likelihood that a portion of text in the document corresponds to a portion of text in the manual translation of the document. In some embodiments, the selection module 408 may select one of the plurality of alignments having the highest corresponding probability score (as generated by the scoring module 400).

The mapping module 412 may then communicate with the selection module 408 to determine which of the plurality of alignments has been selected. The mapping module 412 may then map a location of the tag in the original (source) document to a corresponding location within the manual translation of the document based on the selected alignment. While word-by-word alignment and mapping is described above, as previously mentioned, other alignment and/or mapping techniques may also be implemented (phrase-by-phrase, sentence-by-sentence, document-by-document, etc.).

The tagging module 416 communicates with the mapping module 412 to determine the mapping. The tagging module 416 then inserts the tag into the manual translation of the document based on the selected alignment to obtain a modified manual translation. The tagging module 416 may then output the modified manual translation to the user 112, e.g., via the web server 104. In some implementations, the modified manual translation may also be stored at the web server 104. For example, in the future the modified manual translation could be stored for later provision to another user requesting the same translation of the document from the first language to the second language.

Figure 6:
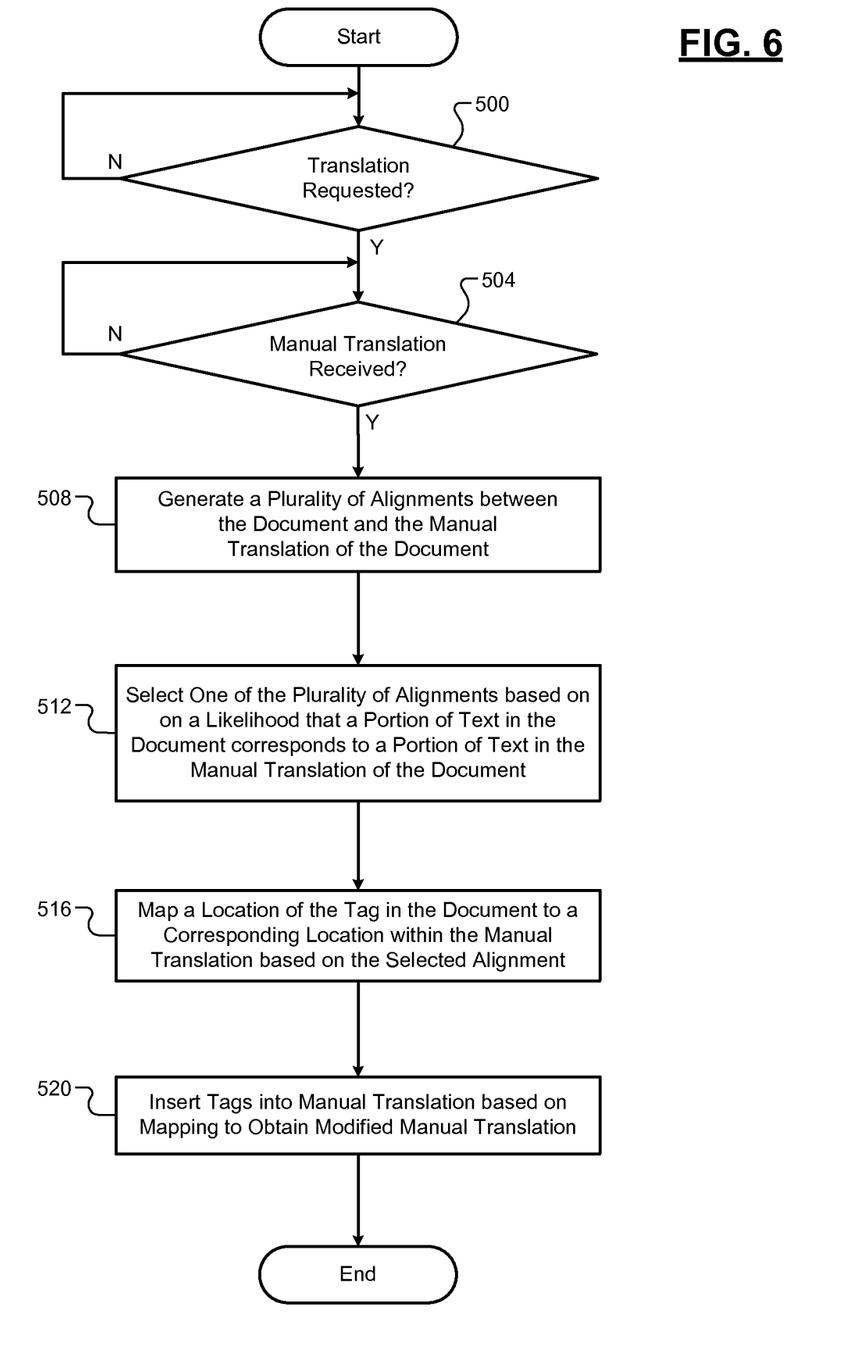
FIG. 6 is a flow diagram of an example of a document translation technique according to some embodiments of the present disclosure.

Referring now to FIG. 6, an example of a technique for translating a document including at least one tag begins at 500. At 500, the translation server 124 determines whether the user 112 has requested translation of a document from a first language to a second language, the second language being different than the first language. If true, control may proceed to 504. If false, control may return to 500. At 504, the translation server 124 determines whether a manual translation of the document has been received from the human translator 128. If true, control may proceed to 508. If false, control may return to 504. At 508, the translation server 124 generates a plurality of alignments between the document and the manual translation of the document.

At 512, the translation server 124 selects one of the plurality of alignments as a selected alignment based on a likelihood that a portion of text (a word, a phrase, a sentence, etc.) in the document corresponds to an associated portion of text in the manual translation of the document according to the selected alignment. At 516, the translation server 124 maps a location of the at least one tag in the original (source) document to a corresponding location within the manual translation of the document based on the selected alignment. At 520, the translation server 124 inserts the at least one tag into the manual translation of the document at the corresponding location based on the mapping to obtain a modified manual translation of the document. Control may then end or return to 500 for one or more additional cycles.

Figure 7:
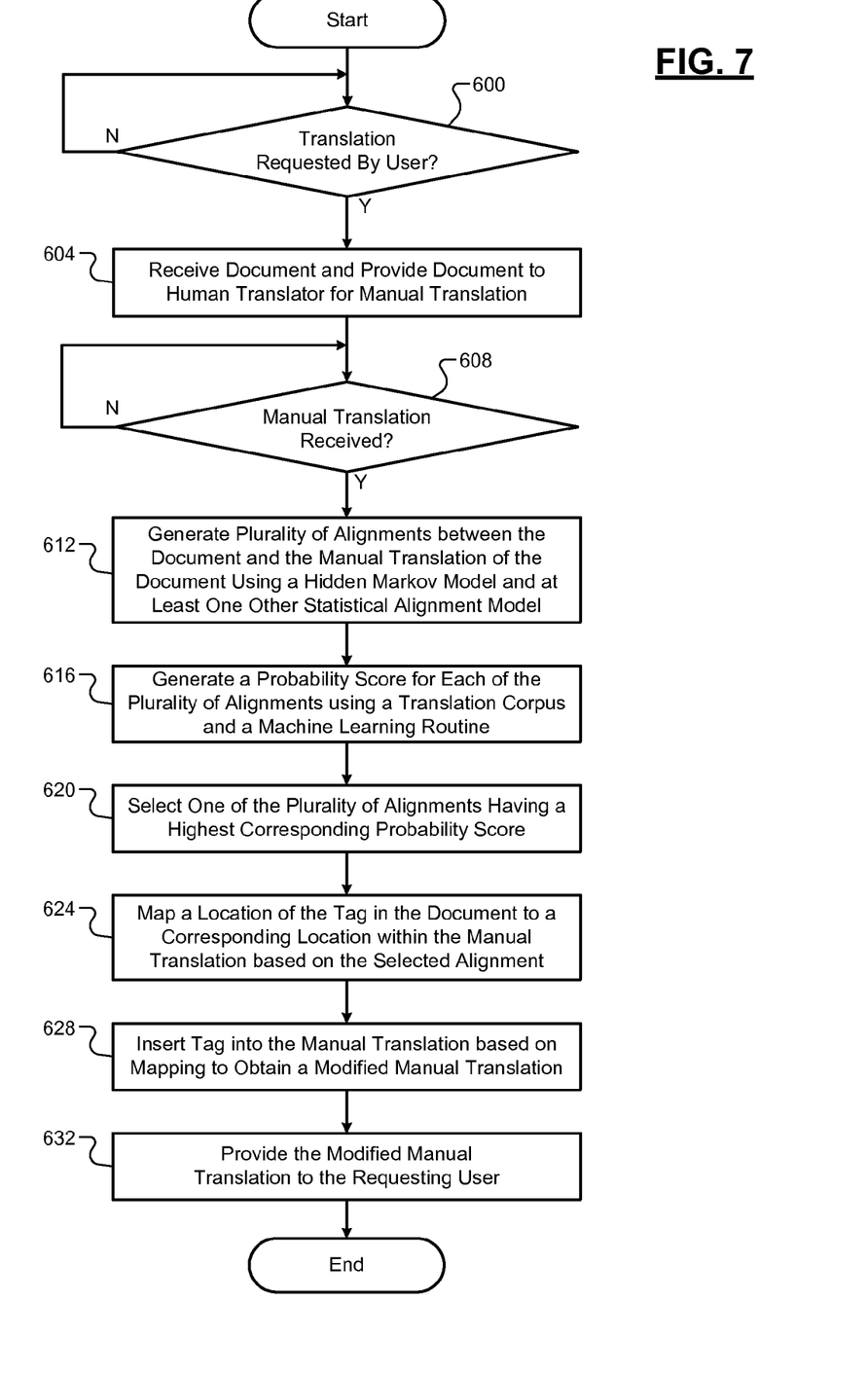
FIG. 7 is a flow diagram of another example of a document translation technique according to some embodiments of the present disclosure.

Referring now to FIG. 7, another example of a technique for translating a document including at least one tag begins at 600. At 600, the translation server 124 determines whether the user 112 has requested translation of a document that includes at least one tag from a first language to a second language, the second language being different than the first language. If true, control may proceed to 604. If false, control may return to 600. At 604, the translation server 124 may receive the document and may also provide the document to the human translator 128 for manual translation of the document. At 612, the translation server 124 determines whether the manual translation of the document has been received from the human translator 128, the manual translation of the document not including the at least one tag and having been translated from the first language to the second language. If true, control may proceed to 612. If false, control may return to 608. At 612, the translation server 124 generates a plurality of alignments between the document and the manual translation of the document using a hidden Markov model and at least one other statistical alignment model. For example, each of the plurality of alignments may associate the portion of text in the document to a portion of text in the manual translation of the document.

At 616, the translation server 124 generates a probability score for each of the plurality of alignments using a translation corpus, e.g., a database of translations, and a machine learning routine or other algorithm configured to maintain probabilities for each entry in the translation corpus. At 620, the translation server 124 may select one of the plurality of alignments having the highest corresponding probability score, although other selection criterion could be used. At 624, the translation server 124 may map a location of the at least one tag in the original (source) document to a corresponding location within the manual translation of the document. At 628, the translation server 124 may insert the at least one tag into the manual translation of the document at the corresponding location based on the mapping to obtain a modified manual translation of the document. At 632, the translation server 124 may provide the modified manual translation of the document to the user 112, e.g., via the web server 104. Control may then end or may return to 600 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
receiving a document from a server, the document including at least one tag associated with a first portion of text within the document;
receiving a request from a user to translate the document from a first language to a second language, the second language being different than the first language;
providing the document to a human translator;
receiving a manual translation of the document from the human translator, the manual translation being a version of the document that has been translated from the first language into the second language by the human translator and that does not include the at least one tag;
generating a plurality of alignments between the document and the manual translation of the document using a hidden Markov model and at least one other statistical alignment model, each of the plurality of alignments associating the first portion of text within the document with a second portion of text within the manual translation of the document;
generating a probability score for each of the plurality of alignments using a translation corpus and a machine learning routine, the probability score for a specific alignment indicating a likelihood that the first portion of text within the document corresponds to the associated second portion of text in the manual translation of the document according to the specific alignment;
selecting one of the plurality of alignments as a selected alignment based on the plurality of probability scores, the selected alignment having a highest corresponding probability score;
mapping a location of the at least one tag in the document to a corresponding location within the manual translation based on the selected alignment;
inserting the at least one tag into the manual translation at the corresponding location to obtain a modified manual translation of the document; and
providing the modified manual translation of the document to the user.

2. A computer-implemented method comprising:
receiving a document and a corresponding request from a user to translate the document from a first language to a second language, the document including at least one tag associated with a first portion of text within the document, the second language being different than the first language;
receiving a manual translation of the document, the manual translation being a version of the document that has been translated from the first language into the second language by a human translator and that does not include the at least one tag;
generating a plurality of alignments between the document and the manual translation of the document using a statistical alignment model, each of the plurality of alignments associating the first portion of text within the document to a second portion of text within the manual translation of the document;
selecting one of the plurality of alignments as a selected alignment based on a likelihood that the first portion of text within the document corresponds to the associated second portion of text within the manual translation of the document according to the selected alignment;
mapping a location of the at least one tag in the document to a corresponding location within the manual translation of the document based on the selected alignment; and
inserting the at least one tag into the manual translation at the corresponding location to obtain a modified manual translation of the document.

3. The computer-implemented method of claim 2, wherein generating the plurality of alignments is performed by using a hidden Markov model and at least one other statistical alignment model.

4. The computer-implemented method of claim 3, wherein the hidden Markov model has a first order dependence in an alignment sequence, and wherein the at least one other statistical alignment model has a zero order dependence in an alignment sequence and has a uniform alignment probability.

5. The computer-implemented method of claim 2, further comprising generating a probability score for each of the plurality of alignments.

6. The computer-implemented method of claim 5 further comprising generating the probability score for each of the plurality of alignments using a translation corpus and a machine learning routine.

7. The computer-implemented method of claim 6 further comprising selecting the one of the plurality of alignments as the selected alignment based on the plurality of probability scores.

8. The computer-implemented method of claim 7 further comprising selecting the one of the plurality of alignments having a highest corresponding probability score as the selected alignment.

9. The computer-implemented method of claim 2, wherein mapping the location of the at least one tag within the document to the corresponding location in the manual translation includes associating the at least one tag with a word in the manual translation.

10. The computer-implemented method of claim 2, further comprising dividing the document into a first plurality of phrases, wherein the manual translation of the document includes a second plurality of phrases corresponding to the firs plurality of phrases, and wherein mapping the location of the at least one tag within the document to the corresponding location in the manual translation includes associating the at least one tag with one of the second plurality of phrases in the manual translation of the document.

11. The computer-implemented method of claim 2, further comprising providing the modified manual translation of the document to the user.

12. A system comprising:
an alignment generation module configured to generate a plurality of alignments between a document and a manual translation of the document using a statistical alignment model, the document including at least one tag associated with a first portion of text within the document, the manual translation being a version of the document that has been translated from a first language to a second language by a human translator and that does not include the at least one tag, the second language being different than the first language, each of the plurality of alignments associating the first portion of text within the document to a second portion of text within the manual translation of the document; and a translation control module configured to
- receive the document and a corresponding request from a user to translate the document from the first language to the second language,
- receive the manual translation of the document,
- select one of the plurality of alignments as a selected alignment based on a likelihood that the first portion of text within the document corresponds to the associated second portion of text within the manual translation of the document according to the selected alignment,
- map a location of the at least one tag in the document to a corresponding location within the manual translation of the document based on the selected alignment, and
- insert the at least one tag into the manual translation at the corresponding location to obtain a modified manual translation of the document.

13. The system of claim 12, wherein the alignment generation module is further configured to generate the plurality of alignments using a hidden Markov model and at least one other statistical alignment model.

14. The system of claim 13, wherein the hidden Markov model has a first order dependence in an alignment sequence, and wherein the at least one other statistical alignment model has a zero order dependence in an alignment sequence and has a uniform alignment probability.

15. The system of claim 12, wherein the translation control module is further configured to generate a probability score for each of the plurality of alignments using a translation corpus and a machine learning routine.

16. The system of claim 15, wherein the translation control module is further configured to select the one of the plurality of alignments as the selected alignment based on the plurality of probability scores.

17. The system of claim 16, wherein the translation control module is further configured selecting the one of the plurality of alignments having a highest corresponding probability score as the selected alignment.

18. The system of claim 12, wherein the translation control module is further configured to map the location of the at least one tag in the document to the corresponding location in the manual translation by associating the at least one tag with a word in the manual translation.

19. The system of claim 12, wherein the translation control module is further configured to divide the document into a first plurality of phrases, wherein the manual translation of the document includes a second plurality of phrases corresponding to the first plurality of phrases, and wherein the translation control module is further configured to map the location of the at least one tag in the document to the corresponding location in the manual translation by associating the at least one tag with one of the second plurality of phrases in the manual translation of the document.

20. The system of claim 12, wherein the translation control module is further configured to provide the modified manual translation of the document to the user.

* * * * *